(12) United States Patent
Kook et al.

(10) Patent No.: US 10,024,398 B2
(45) Date of Patent: Jul. 17, 2018

(54) PLANETARY GEAR TRAIN OF AUTOMATIC TRANSMISSION FOR VEHICLES

(71) Applicant: Hyundai Motor Company, Seoul (KR)

(72) Inventors: Jae Chang Kook, Gyeonggi-do (KR); Hyun Sik Kwon, Seoul (KR); Wonmin Cho, Gyeonggi-do (KR); Seong Wook Hwang, Gyeonggi-do (KR); Seongwook Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 169 days.

(21) Appl. No.: 15/258,632

(22) Filed: Sep. 7, 2016

(65) Prior Publication Data

US 2017/0268615 A1     Sep. 21, 2017

(30) Foreign Application Priority Data

Mar. 16, 2016 (KR) .......................... 10-2016-0031471

(51) Int. Cl.
*F16H 3/66* (2006.01)
(52) U.S. Cl.
CPC ....... *F16H 3/66* (2013.01); *F16H 2200/0069* (2013.01); *F16H 2200/0095* (2013.01); *F16H 2200/2012* (2013.01); *F16H 2200/2048* (2013.01)
(58) Field of Classification Search
None
See application file for complete search history.

(56) References Cited

U.S. PATENT DOCUMENTS

| | | | | |
|---|---|---|---|---|
| 2008/0261762 A1* | 10/2008 | Phillips | ..................... | F16H 3/66 475/276 |
| 2009/0036253 A1* | 2/2009 | Phillips | ..................... | F16H 3/66 475/275 |
| 2009/0118062 A1* | 5/2009 | Phillips | .................. | F16H 3/666 475/276 |
| 2010/0144486 A1* | 6/2010 | Hart | .......................... | F16H 3/66 475/275 |
| 2010/0210395 A1* | 8/2010 | Phillips | .................. | F16H 3/666 475/275 |
| 2013/0072342 A1* | 3/2013 | Shim | ........................ | F16H 3/66 475/276 |

FOREIGN PATENT DOCUMENTS

| | | |
|---|---|---|
| JP | 2005-172123 A | 6/2005 |
| JP | 2013-068320 A | 4/2013 |
| KR | 10-2013-0031453 A | 3/2013 |
| KR | 10-2014-0046240 A | 4/2014 |

* cited by examiner

*Primary Examiner* — Colby M Hansen
(74) *Attorney, Agent, or Firm* — Mintz Levin Cohn Ferris Glovsky and Popeo, P.C.; Peter F. Corless

(57) ABSTRACT

Ten or more forward speeds and at least four reverse speeds are achieved by a planetary gear train of an automatic transmission for a vehicle including an input shaft, an output shaft, four planetary gear sets respectively having three rotational elements, and six control elements for selectively interconnecting the rotational elements and a transmission housing.

8 Claims, 2 Drawing Sheets

FIG. 2

| Shift-stage | Control element | | | | | | | | Gear ratio |
|---|---|---|---|---|---|---|---|---|---|
| | B1 | B2 | B3 | C1 | C2 | C3 | C4 | | |
| D1 | | | ● | | | ● | | | 4.083 |
| D2 | | | ● | | ● | | | | 2.400 |
| D3 | | ● | | | ● | | | | 1.368 |
| D4 | | | | | ● | | ● | | 1.000 |
| D5 | ● | | | ● | | | ● | | 0.929 |
| D6 | ● | | | ● | ● | | | | 0.755 |
| D7 | ● | | | | ● | | | | 0.706 |
| D8 | ● | | | | ● | ● | | | 0.650 |
| D9 | | ● | | | | | ● | | 0.536 |
| D10 | ● | | | ● | | | ● | | 0.430 |
| REV1 | | | ● | ● | | | ● | | -4.667 |
| REV2 | | | ● | ● | | ● | | | -2.800 |
| REV3 | ● | | ● | ● | | | | | -2.178 |
| REV4 | ● | | ● | | | ● | | | -1.270 |

PLANETARY GEAR TRAIN OF AUTOMATIC TRANSMISSION FOR VEHICLES

CROSS-REFERENCE TO RELATED APPLICATION

This application claims under 35 U.S.C. §119(a) the benefit of Korean Patent Application No. 10-2016-0031471 filed in the Korean Intellectual Property Office on Mar. 16, 2016, the entire contents of which are incorporated herein by reference.

BACKGROUND (a) Field of the Invention

The present invention relates to an automatic transmission for a vehicle, more particularly, to a planetary gear train of the automatic transmission capable of realizing at least ten forward speeds, thereby improving power delivery performance and fuel consumption due to multi-stages, and improving driving stability by utilizing a low rotation speed of an engine.

(b) Description of the Related Art

Generally, in automatic transmissions, achieving more shift stages can maximize fuel consumption and driving efficiency.

In particular, engine research has been undertaken to achieve weight reduction and to enhance fuel consumption by so-called downsizing, and research on an automatic transmission has been performed to simultaneously provide better drivability and fuel consumption by achieving more shift stages.

In order to achieve more shift stages for an automatic transmission, the number of parts, particularly the number of planetary gear sets is typically increased and installability, production cost, weight, and/or power flow efficiency according to total length of transmission may be increased.

Therefore, in order to maximize fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is continuously required.

However, the majority of general automatic transmissions having more than eight speeds include three to four planetary gear sets and five to six control elements (friction elements), in this case, total length is increased, which has drawbacks of deteriorating installability.

As a result, plural rows structures of planetary gear sets have been adopted, or a dog clutch is applied in place of wet control elements. However, in this case, applicable structure is restricted and shift feel is deteriorated by applying the dog clutch.

The above information disclosed in this Background section is only for enhancement of understanding of the background of the invention and therefore it may contain information that does not form the prior art that is already known in this country to a person of ordinary skill in the art.

SUMMARY

The present invention provides a planetary gear train of an automatic transmission for a vehicle having advantages of obtaining shift-stages of at least ten forward speeds and at least four reverse speeds by use of a minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present invention includes an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft interconnecting the first rotational element and the fourth rotational element; a second shaft connected with the second rotational element; a third shaft interconnecting the third rotational element and the seventh rotational element; a fourth shaft connected with the fifth rotational element and selectively connected with the second shaft and directly connected with the input shaft; a fifth shaft connected with the sixth rotational element and selectively connected with the second shaft; a sixth shaft interconnecting the eighth rotational element and the twelfth rotational element and selectively connected with the fifth shaft; a seventh shaft interconnecting the ninth rotational element and the eleventh rotational element and directly connected with the output shaft; and an eighth shaft connected with the tenth rotational shaft and selectively connected with the fourth shaft.

The first, third and sixth shafts are selectively connected with the transmission housing respectively.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

A planetary gear train according to an exemplary embodiment of the present invention may further include a first clutch selectively connecting the second shaft and the fourth shaft; a second clutch selectively connecting the fourth shaft and the eighth shaft; a third clutch selectively connecting the second shaft and the fifth shaft; a fourth clutch selectively connecting the fifth shaft and the sixth shaft; a first brake selectively connecting the first shaft and the transmission housing; a second brake selectively connecting the third shaft and the transmission housing and a third brake selectively connecting the sixth shaft and the transmission housing.

According to an exemplary embodiment of the present invention, shift-stages of at least ten forward speeds and at least four reverse speeds may be realized by combination of four planetary gear sets of simple planetary gear sets and six control elements.

In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

In addition, a planetary gear train according to an exemplary embodiment of the present invention maximize engine driving efficiency by multi-stages of an automatic transmission, and may improve power delivery performance and fuel consumption.

BRIEF DESCRIPTION OF THE DRAWINGS

FIG. 2 is an operational chart for respective control elements at respective shift stages in a planetary gear train according to an exemplary embodiment of the present invention.

DETAILED DESCRIPTION OF THE EMBODIMENTS

Figure 1:
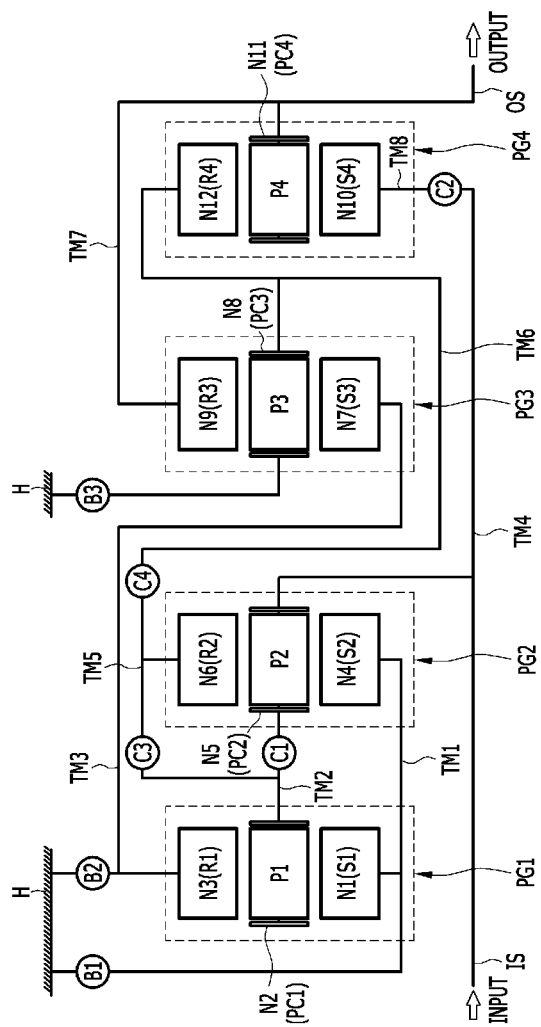
FIG. 1 is a schematic diagram of a planetary gear train according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 arranged on a same axis, an input shaft IS, an output shaft OS, eight shafts TM1 to TM8 interconnecting rotational elements of the first, second, third, and fourth planetary gear sets PG1, PG2, PG3, and PG4, four clutches C1 to C4 and three brakes B1, B2 and B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a double pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as a eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is directly connected with the fourth rotational element N4, the third rotational element N3 is directly connected with the seventh rotational element N7, the eighth rotational element N8 is directly connected with the twelfth rotational element N12 and the ninth rotational element N9 is directly connected with the eleventh rotational element N11 by eight shafts TM1 to TM8.

The eight shafts TM1 to TM8 are arranged as follows.

Each of the eight shafts TM1 to TM8 may be a rotational member that interconnects the input and output shafts and rotational elements of the planetary gear sets PG1, PG2, PG3, and PG4, or may be a fixed member fixed to the transmission housing H.

The first shaft TM1 directly connects the first rotational element N1 (the first sun gear S1) and the fourth rotational element N4 (the second sun gear S2), and is selectively connected with the transmission housing H, thereby acting as a selective fixed element.

The second shaft TM2 is connected with the second rotational element N2 (the first planet carrier PC1).

The third shaft TM3 directly connects the third rotational element N3 (the first ring gear R1) and the seventh rotational element N7 (the third sun gear S3), and selectively connected with the transmission housing H, thereby acting as a selective fixed element.

The fourth shaft TM4 is directly connected with the fifth rotational element N5 (the second planet carrier PC2) and selectively connected with the second shaft TM2, and directly connected with the input shaft IS, thereby always acting as an input element.

The fifth shaft TM5 is connected with the sixth rotational element N6 (second ring gear R2) and selectively connected with the second shaft TM2.

The sixth shaft TM6 directly connects the eighth rotational element N8 (the third planet carrier PC3) and the twelfth rotational element N12 (the fourth ring gear R4) and is selectively connected with the fifth shaft TM5, and is selectively connected with the transmission housing H, thereby acting as a selective fixed element.

The seventh shaft TM7 directly connects the ninth rotational element N9 (third ring gear R3) and the eleventh rotational element N11 (fourth planet carrier PC4), and directly connected with the output shaft OS, thereby always acting as an output element.

The eighth shaft TM8 is connected with the tenth rotational element N10 (the fourth sun gear S4) and selectively connected with the fourth shaft TM4. That is, the eighth shaft TM8 is selectively connected with the fourth shaft TM4 which is directly connected with the input shaft IS, thereby acting as a selective fixed element.

The eight shafts TM1 to TM8, the input shaft IS, and the output shaft OS may be selectively interconnected with one another by control elements of four clutches C1, C2, C3, and C4.

The shafts TM1 to TM8 may be selectively connected with the transmission housing H, by control elements of three brakes B1, B2 and B3.

The four clutches C1 to C4 and the three brakes B1, B2 and B3 are arranged as follows.

The first clutch C1 is arranged between the second shaft TM2 and the fourth shaft TM4, so as to selectively connecting the second shaft TM2 and the fourth shaft TM4 for power delivery.

The second clutch C2 is arranged between the fourth shaft TM4 and the eighth shaft TM8, so as to selectively connecting the fourth shaft TM4 and the eighth shaft TM8 for power delivery.

The third clutch C3 is arranged between the second shaft TM2 and the fifth shaft TM5, so as to selectively connecting the second shaft TM2 and the fifth shaft TM5 for power delivery.

The fourth clutch C4 is arranged between the fifth shaft TM5 and the sixth shaft TM6, so as to selectively connecting the fifth shaft TM5 and the sixth shaft TM6 for power delivery.

The first brake B1 is arranged between the first shaft TM1 and the transmission housing H, such that the first shaft TM1 may be selectively connected with the transmission housing H and act as a fixed element.

The second brake B2 is arranged between the third shaft TM3 and the transmission housing H, such that the third shaft TM3 may be selectively connected with the transmission housing H and act as a fixed element.

The third brake B3 is arranged between the sixth shaft TM6 and the transmission housing H, such that the sixth shaft TM6 may be selectively connected with the transmission housing H and act as a fixed element.

As described above, although the second clutch C2 is selectively connects the fourth shaft TM4 and the eighth shaft TM8, the fourth shaft TM4 is always directly connected to the input shaft IS such that the second clutch C2 may selectively connect the input shaft IS and the eighth shaft TM8 as shown in FIG. 1.

The control elements of the first, second, third, and fourth clutches C1, C2, C3, and C4 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to an exemplary embodiment of the present invention.

Referring to FIG. 2, a planetary gear train according to an exemplary embodiment of the present invention realizes ten forward speeds and four reverse speeds by operating three control elements among the first, second, third, and fourth clutches C1, C2, C3, and C4 and the first, second, and third brakes B1, B2, and B3 at respective shift-stages.

In the forward first speed shift-stage D1, the third brake B3 and the third and fourth clutches C1 and C4 are simultaneously operated.

As a result, the second shaft TM2 is interconnected with the fifth shaft TM5 by the operation of the third clutch C3, and the fifth shaft TM5 is interconnected with the sixth shaft TM6 by the operation of the fourth clutch C4. In this state, torque of the input shaft IS is input to the fourth shaft TM4, and the sixth shaft TM6 acts as a fixed element by the operation of the third brake B3, thereby realizing the forward first speed and outputting a shifted torque through the output shaft OS connected with the seventh shaft TM7.

In the forward second speed shift-stage D2, the third brake B3 and the second clutch C2 and the fourth clutch C4 are simultaneously operated.

As a result, the fourth shaft TM4 is interconnected with the eighth shaft TM8 by the operation of the second clutch C2, and the fifth shaft TM5 is interconnected with the sixth shaft TM6 by operation of the fourth clutch C4. In this state, torque of the input shaft IS is input to the fourth shaft TM4 and the tenth shaft TM10, and the sixth shaft TM6 acts as a fixed element by the operation of the third brake B3, thereby realizing the forward second speed and outputting a shifted torque through the output shaft OS connected with the seventh shaft TM7.

In the forward third speed shift-stage D3, the second brake B2 and the second clutch C2 and the fourth clutch C4 are simultaneously operated.

As a result, the fourth shaft TM4 is interconnected with the eighth shaft TM8 by the operation of the second clutch C2, and the fifth shaft TM5 is interconnected with the sixth shaft TM6 by operation of the fourth clutch C4. In this state, torque of the input shaft IS is input to the fourth shaft TM4 and the tenth shaft TM10, and the third shaft TM3 acts as a fixed element by the operation of the second brake B2, thereby realizing the forward third speed and outputting a shifted torque through the output shaft OS connected with the seventh shaft TM7.

In the forward fourth speed shift-stage D4, the first, second, and fourth clutches C1, C2, and C4 are simultaneously operated.

As a result, the second shaft TM2 is interconnected with the fourth shaft TM4 by the operation of the first clutch C1, the fourth shaft TM4 is interconnected with the eighth shaft TM8 by the operation of the second clutch C2, and the fifth shaft TM5 is interconnected with the sixth shaft TM6 by the operation of the fourth clutch C4. In this case, total planetary gear sets PG1, PG2, PG3, and PG4 integrally rotates, and a torque inputted through the fourth shaft TM4 and the tenth shaft TM10 is outputted as inputted, thereby forming the forward fourth speed and outputting the inputted torque to the output shaft OS connected with the seventh shaft TM7.

In the forward fifth speed shift-stage D5, the first brake B1 and the first clutch C1 and the second clutch C2 are simultaneously operated.

As a result, the second shaft TM2 is interconnected with the fourth shaft TM4 by the operation of the first clutch C1, and the fourth shaft TM4 is interconnected with the eighth shaft TM8 by the operation of the second clutch C2. In this state, torque of the input shaft IS is input to the fourth shaft TM4 and the tenth shaft TM10, and the first shaft TM1 acts as a fixed element by the operation of the first brake B1, thereby realizing the forward fifth speed and outputting a shifted torque through the output shaft OS connected with the seventh shaft TM7.

In the forward sixth speed shift-stage D6, the first brake B1 and the second clutch C2 and the third clutch C3 are simultaneously operated.

As a result, the fourth shaft TM4 is interconnected with the eighth shaft TM8 by the operation of the second clutch C2, and the fifth shaft TM5 is interconnected with the sixth shaft TM6 by the operation of the fourth clutch C4. In this state, torque of the input shaft IS is input to the fourth shaft TM4 and the tenth shaft TM10, and the first shaft TM1 acts as a fixed element by the operation of the first brake B1, thereby realizing the forward sixth speed and outputting a shifted torque through the output shaft OS connected with the seventh shaft TM7.

In the forward seventh speed shift-stage D7, the first brake B1 and the second clutch C2 and the fourth clutch C4 are simultaneously operated.

As a result, the fourth shaft TM4 is interconnected with the eighth shaft TM8 by the operation of the second clutch C2, and the fifth shaft TM5 is interconnected with the sixth shaft TM6 by the operation of the fourth clutch C4. In this state, torque of the input shaft IS is input to the fourth shaft TM4 and the tenth shaft TM10, and the first shaft TM1 acts as a fixed element by the operation of the first brake B1, thereby realizing the forward seventh speed and outputting a shifted torque through the output shaft OS connected with the seventh shaft TM7.

In the forward eighth speed shift-stage D8, the first brake B1 and the third clutch C3 and the fourth clutch C4 are simultaneously operated.

As a result, the second shaft TM2 is interconnected with the fifth shaft TM5 by the operation of the third clutch C3, and the fifth shaft TM5 is interconnected with the sixth shaft TM6 by the operation of the fourth clutch C4. In this state, torque of the input shaft IS is input to the fourth shaft TM4, and the first shaft TM1 acts as a fixed element by the operation of the first brake B1, thereby realizing the forward eighth speed and outputting a shifted torque through the output shaft OS connected with the seventh shaft TM7.

In the forward ninth speed shift-stage D9, the first brake B1 and the first clutch C1 and the fourth clutch C4 are simultaneously operated.

As a result, the second shaft TM2 is interconnected with the fourth shaft TM4 by the operation of the first clutch C1, and the fifth shaft TM5 is interconnected with the sixth shaft TM6 by the operation of the fourth clutch C4. In this state, torque of the input shaft IS is input to the fourth shaft TM4, and the first shaft TM1 acts as a fixed element by the operation of the first brake B1, thereby realizing the forward ninth speed and outputting a shifted torque through the output shaft OS connected with the seventh shaft TM7.

In the forward tenth speed shift-stage D10, the first brake B1, the second brake B2, and the fourth clutch C4 are simultaneously operated.

As a result, the second shaft TM2 is interconnected with the fourth shaft TM4 by the operation of the first clutch C1, the fourth shaft TM4 is interconnected with the eighth shaft TM8 by the operation of the second clutch C2, and the second shaft TM2 is interconnected with the fifth shaft TM5 by the operation of the third clutch C3. In this state, torque of the input shaft IS is input to the fourth shaft TM4, and the first shaft TM1 and the third shaft TM3 act as fixed elements by the operation of the first brake B1 and the second brake B2, thereby realizing the forward tenth speed and outputting a shifted torque through the output shaft OS connected with the seventh shaft TM7.

In the reverse first speed REV1, the third brake B3, the first clutch C1, and the fourth clutch C4 are simultaneously operated.

As a result, the second shaft TM2 is interconnected with the fourth shaft TM4 by the operation of the first clutch C1, and the fifth shaft TM5 is interconnected with the sixth shaft TM6 by the operation of the second clutch C4. In this state, torque of the input shaft IS is input to the fourth shaft TM4, and the sixth shaft TM6 acts as a fixed element by the operation of the third brake B3, thereby realizing the reverse first speed and outputting a shifted torque through the output shaft OS connected with the seventh shaft TM7.

In the reverse second speed REV2, the third brake B3, the first clutch C1, and the third clutch C3 are simultaneously operated.

As a result, the second shaft TM2 is interconnected with the fourth shaft TM4 by the operation of the first clutch C1, and the second shaft TM2 is interconnected with the fifth shaft TM5 by the operation of the third clutch C3. In this state, torque of the input shaft IS is input to the fourth shaft TM4, and the sixth shaft TM6 acts as a fixed element by the operation of the third brake B3, thereby realizing the reverse second speed and outputting a shifted torque through the output shaft OS connected with the seventh shaft TM7.

In the reverse third speed REV3, the first brake B1, the third brake B3, and the first clutch C1 are simultaneously operated.

As a result, the second shaft TM2 is interconnected with the fourth shaft TM4 by the operation of the first clutch C1. In this state, torque of the input shaft IS is input to the fourth shaft TM4, and the first shaft TM1 and the sixth shaft TM6 act as fixed elements by the operation of the first brake B1 and the third brake B3, thereby realizing the reverse third speed and outputting a shifted torque through the output shaft OS connected with the seventh shaft TM7.

In the reverse third speed REV3, the first brake B1, the third brake B3, and the third clutch C3 are simultaneously operated.

As a result, the second shaft TM2 is interconnected with the fifth shaft TM5 by the operation of the third clutch C3. In this state, torque of the input shaft IS is input to the fourth shaft TM4, and the first shaft TM1 and the sixth shaft TM6 act as fixed elements by the operation of the first brake B1 and the third brake B3, thereby realizing the reverse fourth speed and outputting a shifted torque through the output shaft OS connected with the seventh shaft TM7.

As described above, a planetary gear train according to an exemplary embodiment of the present invention may realize at least ten forward speeds and at least four reverse speeds formed by operating four planetary gear sets PG1, PG2, PG3, and PG4 by controlling the four clutches C1, C2, C3, and C4 and the three brakes B1, B2 and B3.

In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

In addition, a planetary gear train according to an exemplary embodiment of the present invention may maximize engine driving efficiency by multi-stages of an automatic transmission, and may improve power delivery performance and fuel consumption.

In addition, a planetary gear train according to an exemplary embodiment of the present invention may improve reverse performance by realizing shift stages of reverse four speeds While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
an input shaft for receiving an engine torque;
an output shaft for outputting a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
a first shaft interconnecting the first rotational element and the fourth rotational element;
a second shaft connected with the second rotational element;
a third shaft interconnecting the third rotational element and the seventh rotational element;
a fourth shaft connected with the fifth rotational element and selectively connected with the second shaft and directly connected with the input shaft;
a fifth shaft connected with the sixth rotational element and selectively connected with the second shaft;
a sixth shaft interconnecting the eighth rotational element and the twelft rotational element and selectively connected with the fifth shaft;
a seventh shaft interconnecting the ninth rotational element and the eleventh rotational element and directly connected with the output shaft; and
an eighth shaft connected with the tenth rotational element and selectively connected with the fourth shaft.

2. The planetary gear train of claim 1, wherein:
the first, third and sixth shafts are selectively connected with the transmission housing respectively.

3. The planetary gear train of claim 1, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

4. The planetary gear train of claim 2, further comprising:
a first clutch selectively connecting the second shaft and the fourth shaft;
a second clutch selectively connecting the fourth shaft and the eighth shaft;
a third clutch selectively connecting the second shaft and the fifth shaft;
a fourth clutch selectively connecting the fifth shaft and the sixth shaft;
a first brake selectively connecting the first shaft and the transmission housing;
a second brake selectively connecting the third shaft and the transmission housing; and
a third brake selectively connecting the sixth shaft and the transmission housing.

5. A planetary gear train of an automatic transmission for a vehicle, comprising:
an input shaft for receiving an engine torque;
output shaft for outputting a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is directly connected with the fifth rotational element, the output shaft is directly connected with the eleventh rotational element, the first rotational element is directly connected with the fourth rotational element, the third rotational element is directly connected with the seventh rotational element, the fifth rotational element is selectively connected with the second rotational element, the sixth rotational element is selectively connected with the second rotational element, the eighth rotational element is directly connected with the twelfth rotational element and selectively connected with the sixth rotational element and selectively connected with the transmission housing, the ninth rotational element is directly connected with the eleventh rotational element, and the tenth rotational element is selectively connected with the fourth rotational element.

6. The planetary gear train of claim 5, wherein:

the first rotational element, the third rotational element and the eighth rotational element are selectively connected with the transmission housing respectively.

7. The planetary gear train of claim 5, wherein:

the first, second, and third rotational elements of the first planetary gear set are respectively a first sun gear, a first planet carrier, and a first ring gear of the first planetary gear set;

the fourth, fifth, and sixth rotational elements of the second planetary gear set are respectively a second sun gear, a second planet carrier, and a second ring gear of the second planetary gear set;

the seventh, eighth, and ninth rotational elements of the third planetary gear set are a third sun gear, a third planet carrier, and a third ring gear of the third planetary gear set; and the tenth, eleventh, and twelfth rotational elements of the fourth planetary gear set are respectively a fourth sun gear, a fourth planet carrier, and a fourth ring gear of the fourth planetary gear set.

8. The planetary gear train of claim 6, further comprising:

a first clutch selectively connecting the second rotational element and the fifth rotational element;

a second clutch selectively connecting the fifth rotational element and the tenth rotational element;

a third clutch selectively connecting the second rotational element and the sixth rotational element;

a fourth clutch selectively connecting the sixth rotational element and the eighth rotational element;

a first brake selectively connecting the first rotational element and the transmission housing;

a second brake selectively connecting the third rotational element and the transmission housing; and a third brake selectively connecting the eighth rotational element and the transmission housing.

* * * * *